Patented Apr. 22, 1947

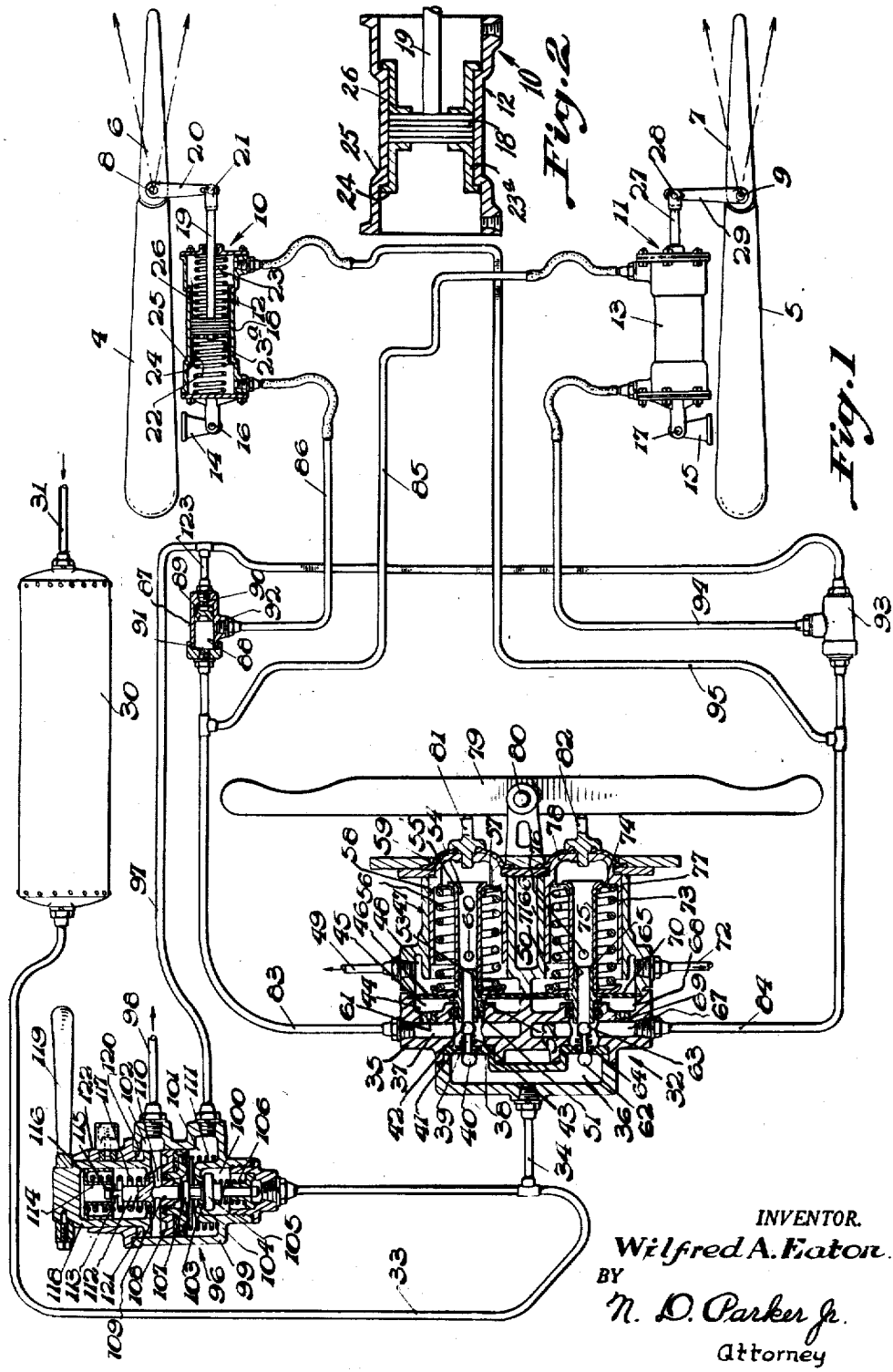

2,419,443

UNITED STATES PATENT OFFICE 2,419,443

FLUID PRESSURE CONTROL SYSTEM

Wilfred A. Eaton, Elyria, Ohio, assignor to Bendix-Westinghouse Automotive Air Brake Company, Elyria, Ohio, a corporation of Delaware Application June 7, 1943, Serial No. 489,982

12 Claims. (Cl. 244—85)

This invention relates to control mechanism, and more particularly to fluid pressure control mechanism for airplanes.

It has previously been proposed to employ movable control surfaces on airplanes to control the speed of the airplane, but the previous systems proposed have necessitated the use of control surfaces for this purpose separate from those used for steering the airplane, with consequent increased weight and complication of the mechanism, and it is accordingly an object of the present invention to provide control mechanism for an airplane so constituted as to overcome these difficulties.

Another object of the invention is to provide, in an airplane of the type having a plurality of control surfaces for controlling the direction of flight of the airplane, control mechanism for these surfaces, so constituted as to be used to control both the direction of flight and the speed of the airplane.

Still another object of the invention is to provide, in an airplane having a pair of control surfaces for controlling the direction of movement of the airplane, means under the control of the pilot for actuating these surfaces to control the speed of the airplane without preventing the use of these surfaces to control the direction of flight of the airplane.

A still further object of the invention is to provide, in an airplane of the type having a plurality of control surfaces for controlling the direction of flight of the airplane, separate fluid pressure actuators for independently controlling the operation of the surfaces, together with novel means for controlling the supply of fluid pressure to the actuators.

Yet another object of the invention is to provide, in a system of the above type, means for normally maintaining the control surfaces in a neutral position with a predetermined force together with means for rendering the control surfaces immediately responsive to the operation of the pilot's control elements in order to provide safe and satisfactory operation of the airplane.

These and other novel features and objects of the invention will be more readily understood when considered in the light of the accompanying drawing and the following description. In the drawing, the single figure illustrates diagrammatically, and partially in section, a control mechanism of the above type.

It is to be expressly understood, however, that the drawing is employed for purposes of illustration only, and is not to be considered as limiting the scope of the invention, reference for this purpose being had to the appended claims.

Referring to the drawings:

Fig. 1 is a diagrammatic view partly in section of a control device embodying the invention, and Fig. 2 is a sectional view of one of the fluid motors.

With reference to the drawing, the invention is illustrated in Fig. 1 as applied to an airplane having a pair of fixed surfaces 4 and 5, which are a part of the body or fuselage of the airplane, not shown, a pair of control surfaces or rudders 6 and 7 being pivotally mounted on axes 8 and 9 carried by the body of the airplane for movement with respect thereto in order to control the operation of the airplane. These control surfaces or airfoils are independently operated in order to permit them to readily adjust themselves to variations in the slip stream conditions adjacent the airfoils, such operation being obtained by means of fluid motors 10 and 11 provided with casings 12 and 13 pivotally mounted on the body of the airplane by means of brackets 14 and 15 and pivot pins 16 and 17. The fluid motors are preferably of the so-called double acting type, and with reference to the motor 10, shown in section, the casing 12 is provided with a piston 18 slidably mounted therein for movement in either direction and adapted to operate the control surface 6 through the medium of a piston rod 19 connected to a lever 20 by means of a pivot pin 21, the lever 20 being operatively connected with the control surface 6 for movement therewith. As shown in the drawing, the piston 18 is normally maintained in the neutral position shown by means of a pair of springs 22 and 23, these springs being of the preloaded type. The spring 22, for example, is interposed between the left end of the cylinder and the right end of the spring cage 23a slidably mounted in the casing 12, movement of the cage 23a to the right being prevented by means of a flange 24 adapted to engage a shoulder 25 formed in the casing, it being understood that on movement of the piston to the left, the cage is free to move to the left away from the shoulder 25 in order to permit compression of the neutralizing spring 22. With this arrangement, it will be understood that since the spring is prevented from expanding to the right beyond the point shown by the cage 23a, the spring may be precompressed or preloaded to any desired degree when installed, in order to oppose movement of the piston to the left with any desired predetermined force. The spring 23 is likewise installed in the same manner and restrained from expansion to the left by means of a similar cage 26, and is preferably preloaded to the same degree as the spring 22 in order to maintain the piston, and therefore the control surface, in the position shown with a predetermined force. In like manner, the motor 11 is adapted to actuate the control surface 7 through the medium of a piston rod 27 connected by a pivot pin 28 to an operating lever 29 carried by the control surface, it being understood that the piston rod and consequently the control surface is likewise maintained in neutral position by preloaded springs in the same manner as the piston of the motor 10 and the control surface 6. Thus the control surfaces or rudders are normally maintained in neutral position at all times by a predetermined force, and are adapted to be independently operated by the fluid motors on application of fluid pressure thereto.

In order that the fluid motors may be operated to control the surfaces 6 and 7, and thus control the direction of flight of the airplane, the airplane is provided with a suitable source of fluid pressure or reservoir 30 supplied with fluid pressure by means of a suitable compressor, not shown, through a conduit 31, the reservoir 30 serving to supply fluid pressure to a pilot's control valve mechanism 32 through conduits 33 and 34.

The valve mechanism 32 is provided with a casing 35 provided with an inlet chamber 36 at the left end, the upper portion of the valve being provided with an outlet chamber 37 separated from the inlet chamber 36 by means of a partition 38 provided with a centrally located port 39, this port being normally closed by means of an inlet valve 40 provided with a stem 41 extending into the outlet chamber and having an exhaust valve 42 formed on the end thereof, the inlet valve being normally maintained in the position shown by means of a spring 43 interposed between the exhaust valve and the right side of the partition 38. A second partition 44 separates the outlet chamber 37 from a diaphragm chamber 45, the right side of the chamber being closed by means of a diaphragm 46 clamped by suitable means between the casing 35 and a closure member 47, the closure member forming in connection with the diaphragm an exhaust chamber 48 having a conduit 49 connecting the chamber with atmosphere. Actuation of the inlet and exhaust valves is accomplished by means of a valve operating element 50 carried by the diaphragm, the lower end of this element extending into the outlet chamber 37 through a suitable seal 51 mounted in a bore 52 formed in the partition 44, the element being provided with a centrally located bore 53 adapted on movement to the left to contact the exhaust valve 42, and on further movement to the left to open the inlet valve 40 to establish communication between the inlet chamber 36 and the outlet chamber 37. A hollow stem 54 is threadedly received by the valve operating element 50 and is provided at its right end with a flange portion 55, a graduating spring 56 being interposed between the right side of the diaphragm and a washer 57 slidably mounted on the member 54 and prevented from movement to the right by engagement with the flange 55, this washer serving in connection with the flange 55 to permit the graduating spring to be installed in a precompressed or preloaded condition in such a manner that a predetermined force may be exerted on the washer 57 to the left before flexing of the spring occurs. The right-hand portion of the closure member 47 is provided with a bore 58, having a valve operating plunger 59 slidably mounted in the bore, and serving on movement to the left to move the washer 57 to the left and compress the graduating spring. It will be understood that with the parts in the position shown, the inlet valve 40 serves to prevent communication between the inlet chamber and the outlet chamber, while the exhaust valve 42 permits communication between the outlet chamber and atmosphere through the bore 53, ports 60 formed in the wall of the member 54, exhaust chamber 48 and exhaust conduit 49. It is also noted that the diaphragm is subjected at all times to the pressure in the outlet chamber by reason of the choke 61 located in the partition 44 and connecting the two chambers. A valve mechanism of identical construction is formed in the lower part of the casing being provided with an inlet valve 62, an exhaust valve 63, a valve spring 64, a valve operating element 65 provided with a centrally located bore 66, an outlet chamber 67, a diaphragm chamber 68 connected thereto by means of a choke 69, diaphragm 70, an exhaust chamber 71 connected with atmosphere by means of an exhaust conduit 72, together with a precompressed graduating spring interposed between the right face of the diaphragm and the left face of a washer 74 slidably mounted on a tubular member 75 carried by the valve operating element 65, the tubular member being provided with an exhaust port 76. The graduating spring is thus preloaded in the lower valve in the same manner as the graduating spring 56 in the upper valve, the closure member 47 likewise being provided with a second bore 77, provided with a plunger 78 slidably mounted therein and adapted on movement to the left to move the washer 74 to the left and compress the graduating spring.

Operation of the two control valves in the valve mechanism 32 is accomplished by means of a rudder bar 79 pivotally mounted on the closure member 47 of the valve mechanism by means of a suitable pivot pin 80, a connection between the rudder bar and the valve operating plungers 59 and 78 being provided by means of extensions 81 and 82 carried respectively by the above plungers. It will thus be apparent that counter-clockwise movement of the rudder bar will serve to operate the plunger of the upper valve without changing the relation of the parts of the lower valve while on clockwise rotation of the rudder bar, the reverse action will occur and the lower valve will be operated. The outlet chamber 37 of the upper valve is provided with an outlet conduit 83, while the outlet chamber 67 of the lower valve is provided with an outlet conduit 84, and it will be understood that on counter-clockwise rotation of the rudder bar, the exhaust valve 42 will first engage the end of the bore 53 to disestablish communication between the outlet chamber and atmosphere, subsequent movement of the mechanism serving to open the intake valve and permitting the establishment of communication between the inlet chamber and the conduit 83 through the port 39 and outlet chamber 37. In view of the preloading of the graduating spring, it will be understood that on initial movement of the rudder bar to close the exhaust valve and open the intake valve, the intake valve will remain open until the pressure in the outlet chamber and in the diaphragm chamber 45 exceeds the force on the diaphragm sufficiently to overcome the preloading of the spring, whereupon the diaphragm will move to the right to compress the spring and permit closing of the inlet valve under the action of the valve spring 43. On further movement of the rudder bar in the same direction, the preloading of the graduating spring will be ineffective and any increase in pressure in the outlet chamber and in the diaphragm chamber will tend to further compress the graduating spring and permit the intake valve to move to closed or lapped position, the pressure delivered in the outlet chamber of the valve thus being at all times proportional to the degree of movement of the rudder bar after initial movement has occurred sufficient to overcome the preloading of the graduating spring. In like manner, movement of the rudder bar in a clockwise direction will initially serve to close the exhaust valve and open the intake valve to establish a pressure in the outlet chamber 67 and in the conduit 84 corresponding to the preloading of the graduating spring, and on further movement to establish a pressure corresponding to the degree of movement of the rudder bar, it thus being possible for the operator to selectively control the pressures in the conduits 83 and 84 in proportion to the degree of movement of the rudder bar in either direction.

The outlet conduit 83 is connected with the right end of the fluid motor 11 by means of a conduit 85, and is connected to the left end of the motor 10 through a conduit 86 and a double check valve mechanism 87 interposed therebetween. The double check valve mechanism is provided with a bore 88 and a valve member 89 slidably mounted therein and adapted on movement at either end of the bore to seal outlet ports 90 and 91, the bore being provided with a port 92 connected with the conduit 86. Thus with the valve plunger 89 in the position shown, it will be understood that communication is established between conduit 83 and 86, while communication is prevented between either of these conduits and the port 90 of the double check valve. Thus on movement of the rudder bar in a counter-clockwise direction to control the operation of the airplane, fluid pressure is supplied to the left end of the motor 10 from the valve mechanism 32 through conduit 83, double check valve 87 and conduit 86 to move the piston 18 to the right and move the rudder 6 in a counter-clockwise direction, fluid pressure at the same time being supplied to the right end of the motor 11 through conduit 83 and conduit 85 to move the piston rod 27 to the left and likewise move the rudder 7 in a counter-clockwise direction, this action causing the airplane to deviate from a straight line and to turn to the right. In like manner on clockwise movement of the rudder bar about the pivot pin 80, the valve mechanism serves to supply fluid pressure to the left end of the motor 11, through conduit 84, a double check valve 93 constructed in the same manner as the valve 87 and a conduit 94, it being understood that the double check valve 93 serves to connect conduits 84 and 94 in the same manner that the double check valve 87 serves to connect conduits 83 and 86. At the same time fluid pressure is supplied to the right end of the motor 10 through conduit 84 and a conduit 95 interconnected therebetween, the result being that the piston 18 of the motor 10 is moved to the left to move the rudder 6 in a clockwise direction, while the piston rod 7 of the motor 11 is moved to the right to likewise move the rudder 7 in a clockwise direction to cause the airplane to deviate to the left.

As heretofore explained, the pistons of the motors 10 and 11 are normally maintained in neutral position with a predetermined degree of force, and it will be understood that in the event the graduating springs of the control valve mechanism 32 were not correspondingly preloaded, considerable movement of the rudder bar and corresponding compression of the graduating springs might be necessary before the pressure delivered to the motors was sufficient to overcome this force and permit movement of the rudder to control the flight of the airplane, and it is accordingly seen that it is desirable to choose the preloading of the graduating springs in such a manner that the pressure acting on the diaphragms 46 and 70 necessary to overcome the preloading of the graduating spring is substantially the same as the pressure necessary on the pistons of the fluid motors 10 and 11 to overcome the preloaded springs therein, this resulting in a mode of operation wherein initial movement of the rudder bar immediately actuates the valve mechanism 32 to supply sufficient pressure to the motors to overcome the preloaded springs and to condition them for further operation to control the rudders, further movement of the rudder bar increasing the pressure in the motors by an amount proportional to the further movement of the rudder bar to exert equal actuating forces on the rudders which will likewise be proportional to the further degree of movement of the rudder bar, this resulting in an efficient form of control which is at all times responsive to the will of the operator.

While the fluid pressure control mechanism above described may be utilized with any type of fluid medium, it will be understood that a compressible fluid medium such as air may be preferred, and in this event, it will be seen that equal forces of a resilient nature are always applied to both of the rudders by corresponding actuators to provide a flexible and individual control of the rudders which allows them to readily adjust themselves to differences in the slip stream conditions adjacent each rudder. Since the rudders of an airplane are likewise moving through a compressible medium, it will be understood that movement of the rudders away from neutral position is opposed by the resilient forces exerted thereon by the slip stream, while the actuating forces exerted on the rudders are of an equally resilient nature and permit the rudders to readily adjust themselves to varying atmospheric conditions. It is also pointed out that when the airplane is moving in a circular path, the velocity of the slip stream flowing by the inner rudder is less than that flowing by the outer rudder, and consequently the force exerted by the slip stream tending to return the rudders to neutral position is different on the two rudders. By operating different rudders moving on different circular arcs of travel by resilient rather than non-resilient force, a mode of operation is introduced wherein each of the rudders automatically adjusts itself to its most efficient position, thus eliminating unnecessary drag on the airplane when turning which would tend to diminish the speed.

As heretofore stated, it has also been found desirable to provide means such as movable control surfaces for controlling the speed of an airplane in flight, and particularly the speed of an airplane when diving. This is accomplished in the present invention by utilizing the same control surfaces for steering the airplane as are utilized for controlling the speed of the airplane in a dive, this being accomplished without loss of directional control on the part of the pilot. Referring again to the drawing, means are therefore provided under the control of the pilot, for supplying fluid pressure simultaneously to the left ends of both fluid motors in order to move rudders 6 and 7 in opposite directions with equal forces, the mechanism including a self-lapping valve mechanism 96 supplied with fluid pressure from the reservoir 30 through conduit 33 and having an outlet conduit 97 and an exhaust conduit 98. This valve is likewise of the so-called self-lapping type similar in construction to the valve 32, and provided with an inlet chamber 100, an outlet chamber 101 and an exhaust chamber 102. The inlet and outlet chambers are separated by means of a partition 103 having a port 104 formed therein and normally closed by means of an inlet valve 105 maintained in closed position by means of an inlet valve spring 106. The central portion of the inlet valve extends upwardly to the outlet chamber and is provided at its upper end with an exhaust valve portion 107. A piston 108 is slidably mounted in the casing and is provided with a central bore 109 in line with the exhaust valve and connected with the exhaust chamber by means of lateral passages 110. The piston is normally maintained in the position shown by means of a relatively light spring 111 interposed between the casing and the lower end of the piston, and the upper end of the piston is provided with an upwardly extending stem 112. The upper end of the stem has a portion 113 of reduced diameter and a spring cage 114 is slidably mounted thereon, upward movement of the cage being limited by means of a shoulder 115 formed on the upper end of the piston stem. The upper end of the cage is provided with a flanged portion 116, and a graduating spring 117 is interposed between the upper surface of the piston and the lower side of the flange, this spring being preloaded in the same manner as the graduating springs of the valve mechanism 32, in order that initial operation of the valve will deliver a pressure to the fluid motors sufficient to balance the preloading of the neutralizing springs in the motors. The mode of operation of the valve is substantially the same as that of the valve 32 except that the valve is cam-operated, a cam member 118 being slidably and rotatably mounted in the upper end of the housing and adapted for rotation by means of a handle 119 pivotally attached thereto. The lower end of the cam is provided with cam teeth 120 which engage similar cam teeth 121 formed on a closure member 122 carried by the upper portion of the casing 99, the result being that on rotation of the cam member by the handle, the cam will move downward in the housing, thus compressing the graduating spring and operating the valve mechanism to dis-establish the connection between the outlet conduit 97 and the exhaust conduit 98 to establish a connection between the inlet conduit 33 and the outlet conduit 97.

When the airplane is travelling a straight line, and it is desired to operate the rudders 6 and 7 to control the speed of the airplane, operation of the control valve 96 will serve to supply fluid pressure to the right ends of the double check valves 87 and 93, the fluid being supplied to the check valve 87 through the conduit 97 and a conduit 123, and to the double check valve 93 through conduit 97, thus moving the plungers of the double check valves to the left to seal off conduits 83 and 84 to establish a connection between the control valve and the left end of the motor 10 through conduits 97 and 123, double check valve 87 and conduit 86, and to supply fluid pressure to the left end of the motor 11 through conduit 97, double check valve 93 and conduit 94. Thus fluid at the same pressure is supplied to the left ends of both motors to force the piston rods 19 and 27 to the right to move the rudder 6 in a counter-clockwise direction and the rudder 7 in a clockwise direction with the same degree of force, the rudders in this position serving to decrease the speed of movement of the airplane. It will be also understood that in the event the speed of the airplane is excessive when the rudders are so operated, the maximum pressure delivered by the control valve 96 may be chosen as to prevent movement of the rudders sufficiently to overstress the airplane, it being apparent that as the speed of the airplane is decreased due to the action of the rudders, the slip stream forces tending to return the rudders to neutral position will likewise decrease and permit the selected fluid pressure acting on the actuators to increase the angle of movement of the rudders in the event they are not already in their extreme outward positions.

When the rudders are operated in this manner to check the speed of the airplane and particularly when the airplane is diving, it is desirable that the pilot be able to maintain directional control of the airplane, and in the mechanism illustrated and described, this form of control is effected by the novel combination of fluid pressure control wherein the check valves serve to permit operation of one or both of the control valves 96 and 32 at the same time without loss of fluid pressure. Thus with the rudders in their opposite outward positions as heretofore described, it will be understood that in the event the pilot desires to turn the airplane to the right from the line of flight being followed, he has only to move the rudder bar in a counter-clockwise direction, whereupon fluid pressure will be supplied to the right end of the fluid motor 11 through conduits 83 and 85, no further fluid pressure being supplied to the left end of the motor 10, however, until the pressure in the conduit 83 is sufficiently greater than the pressure in the conduits 97 and 123 to move the plunger 89 of double check valve to the right to permit the establishment of communication between conduits 83 and 86. Thus, whenever the pressure delivered by the valve 32 is equal to or less than that delivered by the valve 96, there will be no change in the pressure conditions in the motor 10, but the pressure delivered to the right end of the motor 11 will tend to balance the pressure already existing in the left end of the motor with the result that the neutralizing springs will tend to return the rudder 7 to neutral position in a degree dependent on the degree of pressure supplied to the right end of the motor by the operation of the valve 32. When the pressure conditions in the motor 10 are unchanged, however, the rudder 6 will remain in the position described, and the action of the slip stream thereon will cause the airplane to turn to the right. In like manner, clockwise rotation of the rudder bar will supply fluid pressure to the right end of the fluid motor 10 to equalize the pressure in the motor 10 to allow the neutralizing springs to return the rudder 6 toward neutral position, while conditions in the motor 11 will be substantially unchanged, thus permitting the rudder 7 to steer the plane to the left. It will thus be apparent that even though the valve 96 is operated to move the rudders 6 and 7 to their extreme opposite positions to retard the speed of the airplane, the pilot will still be able to control the direction of flight of the airplane to the right or left by means of one of the rudders by operating the rudder bar in the conventional manner.

There has thus been provided by the present invention novel means for utiliizng the same surfaces for controlling both the speed and direction of flight of an airplane under the complete control of the pilot, and it is understood that the same principles may be applied to an airplane having more than two rudders for controlling the direction of flight.

While the invention has been illustrated and described with considerable particularity, it is to be understood that the same is not limited to the form shown but may receive a variety of expressions as will readily appear to those skilled in the art. Reference will, therefore, be had to the appended claims for a definition of the limits of the invention.

What is claimed is:

1. The combination in an airplane having a body portion and a pair of airfoils movably mounted with respect thereto for controlling the direction of movement of the airplane, of means for operating said airfoils and for resiliently biasing each of said airfoils away from neutral position in the same direction with equal forces including a source of compressed fluid, a double acting fluid actuator for each airfoil having a pressure responsive member movable in either direction from a neutral position and operatively connected with the corresponding airfoil, preloaded springs associated with each actuator for normally maintaining the pressure responsive member thereof and the corresponding airfoil in neutral position with a predetermined force, a pilot's control element, and a pair of control valves connected with said source operable by said element for controlling the pressure of fluid in said actuators substantially in accordance with the degree of movement of said element, each of said control valves including a valve operating member responsive to the pressure delivered to the actuators, a resilient connection between each of said last named pressure responsive members and element, and means for preventing flexing of said resilient connections on movement of said element from neutral position to operate the valves except when the pressure delivered to said actuators and acting on said valve operating members is substantially equal to that necessary to overcome the force exerted by said preloaded springs for maintaining the first named pressure responsive members in neutral position.

2. The combination in an airplane having a body portion and a pair of airfoils movably mounted with respect thereto for controlling the direction of movement of the airplane, of means for operating said airfoils including a source of fluid pressure, a fluid actuator for each airfoil for moving the latter in either direction from a neutral position, operator controlled self-lapping valve means for supplying fluid pressure from the source to said actuators for moving the corresponding airfoils in opposite directions for controlling the speed of the airplane without changing the direction of movement thereof, a pilot's control element, and self-lapping valve means controlled by the operation of said element in either direction for supplying fluid pressure from said source to said actuators for selectively neutralizing the force exerted by the fluid pressure supplied to one or the other of said actuators by said operator controlled means and permitting the corresponding airfoil to return toward neutral position, whereby the other airfoil is effective to change the direction of movement of the airplane.

3. The combination in an airplane having a body portion, a pair of airfoils having neutral positions and movably mounted with respect thereto for controlling the operation of the airplane, a source of power, and a power actuator for each airfoil, of operator controlled means for connecting said source and actuators for moving the airfoils in opposite directions from neutral position to control the speed of the airplane, a pilot's control element, and means controlled by the operation of said element for connecting said source and actuators for selectively neutralizing the energization thereof by the first named means for moving the corresponding airfoil to neutral position, whereby the other airfoil is effective to change the direction of movement of the airplane.

4. The combination in an airplane having a body portion, a pair of airfoils having neutral positions and movably mounted with respect thereto for controlling the operation of the airplane, a source of fluid pressure, and a fluid actuator for each airfoil, of operator controlled valvular means for supplying fluid pressure to said actuators for moving the airfoils in opposite directions from neutral position to control the speed of the airplane, a pilot's control element, and valvular means controlled by the operation of said element for supplying fluid pressure to said actuators for selectively neutralizing the pressure supplied thereto by the first named means for moving the corresponding airfoil to neutral position, whereby the other airfoil is effective to change the direction of movement of the airplane.

5. The combination in an airplane having a body portion, a pair of airfoils having neutral positions and movably mounted with respect thereto for controlling the operation of the airplane, a source of fluid pressure, and a fluid actuator for each airfoil, of an operator controlled member and valvular means operated thereby for supplying fluid pressure to said actuators at a pressure substantially proportional to the degree of movement of said member for moving said airfoils in opposite directions from neutral position for controlling the speed of the airplane, a pilot's control element, and valvular means operated thereby for supplying fluid pressure to said actuators at a pressure proportional to the degree of movement of said element for selectively neutralizing the pressure supplied thereto by the first named valvular means for moving the corresponding airfoil to neutral position whereby the other airfoil is effective for controlling the direction of movement of the airplane.

6. The combination in an airplane having a body portion, a pair of airfoils movable mounted with respect thereto for controlling the operation of the airplane, and a source of fluid pressure, of means for controlling the operation of said airfoils including a double acting fluid motor for operating each airfoil, an operator controlled member, means including a self-lapping valve controlled by said member having a connection with said source and a connection with said motors operable for exhausting fluid pressure from said motors and operable for supplying fluid pressure to said motors at a pressure substantially proportional to the degree of movement of said member for moving said airfoils in opposite directions for controlling the speed of the airplane, a pilot's control element movable in either direction from a neutral position, means including a pair of self-lapping control valves selectively operable by said element having a connection with said source and connections with said motors and operable on movement of said element in one direction to supply fluid pressure to said motors at a pressure substantially proportional to the degree of movement of said element from neutral position for moving said airfoils in one direction to steer the airplane in one direction and on movement of said element in the other direction from neutral position to supply fluid pressure to said motors at a pressure substantially proportional to the degree of movement of said element to steer the airplane in the opposite direction, and valve means interconnected between said second named connection and said last named connections for preventing the flow of fluid pressure from the second named valve to the first named valve.

7. The combination in an airplane having a body portion, a pair of air foils movably mounted with respect thereto for controlling the operation of the airplane, and a source of fluid pressure, of means for controlling the operation of said airfoils including a double acting fluid motor for operating each airfoil, an operator controlled member, means including a valve controlled by said member having a connection with said source and a connection with said motors and operable for supplying fluid pressure to said motors at a pressure substantially proportional to the degree of movement of said member for moving said airfoils in opposite directions for controlling the speed of the airplane, a pilot's control element movable in either direction from a neutral position, means including a pair of control valves selectively operable by said element having a connection with said source and connections with said motors and operable on movement of said element in one direction to supply fluid pressure to said motors at a pressure substantially proportional to the degree of movement of said element from neutral position for moving said airfoils in one direction to steer the airplane in one direction and on movement of said element in the other direction from neutral position to supply fluid pressure to said motors at a pressure substantially proportional to the degree of movement of said element to steer the airplane in the opposite direction, and valvular means associated with the connections between said valves and motors for permitting control of the pressures in said motors to steer the airplane in response to operation of said element and last named valves while fluid pressure is being supplied to said motors by said first named valve to operate the airfoils to control the speed of the airplane.

8. The combination in an airplane having a body portion, a pair of airfoils movably mounted with respect thereto for controlling the operation of the airplane and a fluid actuator for operating each airfoil, of a source of fluid pressure, operator controlled valvular means for supplying fluid pressure from the source to said actuators to move said airfoils in opposite directions to control the speed of the airplane, and operator controlled valvular means for supplying fluid pressure from the source to said actuators for moving said airfoils to steer the airplane regardless of the action of said first named means.

9. The combination in an airplane having a body portion, a pair of airfoils movably mounted with respect thereto for controlling the operation of the airplane, a source of fluid pressure, a fluid actuator for operating each of said airfoils, and means for normally preventing movement of said airfoils from a neutral position with a predetermined force, of means including an operator controlled valve and a valve operating member operable on initial movement thereof to supply fluid to said actuators at a pressure sufficient to balance said predetermined force and on further movement to supply fluid pressure to said actuators at a pressure proportional to the degree of movement of said member for moving said airfoils in opposite directions to control the speed of the airplane, and means including an operator controlled valvular means and valve operating elements operable on initial movement thereof to supply fluid pressure to said actuators at a pressure sufficient to balance said predetermined force and operable on further movement to supply fluid pressure to said actuators at a pressure proportional to the degree of movement of said element for moving said airfoils in the same direction to steer the airplane regardless of the action of said first named means.

10. The combination in an airplane having a body portion, a pair of airfoils movably mounted with respect thereto for controlling the operation of the airplane, a source of fluid pressure, and a fluid actuator for operating each airfoil, of a pilot's control element, valvular means controlled thereby for supplying fluid pressure to said actuators to move said airfoils in the same direction to steer the airplane, and means including an operator controlled valve for supplying fluid pressure to said actuators and a pair of double check valves for controlling the flow of fluid pressure from said valve to said actuators for moving said airfoils in opposite directions to decrease the speed of the airplane, one of said check valves having connections with the valvular means, the operator-controlled valve, and one of the actuators, and the other of said check valves having connections with said valvular means, operator-controlled valve, and the other of said actuators.

11. The combination in an airplane having a body portion and a pair of airfoils movably mounted with respect thereto for controlling the operation of the airplane, of a fluid motor for operating each airfoil, a source of compressible fluid under pressure, means including a pilot's control element and valvular means controlled thereby for supplying compressible fluid to both said motors at a pressure substantially proportional to the degree of movement of said element for applying equal resilient forces to each of said airfoils to move the latter in the same direction to steer the airplane, means including a valve for supplying fluid pressure to said motors for applying equal resilient forces to said airfoils to move the latter in opposite directions to control the speed of the airplane, and a pair of valve mechanisms responsive to the pressure supplied by said valvular means for controlling the flow of fluid pressure from said valve to said motors, one of said mechanisms having a connection with one of said motors, the other mechanism having a connection with the other motor, and both of said mechanisms having connections with the valvular means and valve.

12. The combination with a body adapted to move through a fluid medium and a pair of control surfaces movably mounted with respect thereto for controlling the movement of said body through said medium, of a source of fluid pressure, a fluid actuator for operating each of said control surfaces, a pair of control elements, valvular means operated by one of said elements for supplying fluid to said actuators from said source at a pressure substantially proportional to the degree of movement of said one element for moving the surfaces in the same direction to control the direction of movement of the body, valvular means operated by the other element for supplying fluid pressure to said actuators from said source to move the surfaces in opposite directions to control the speed of the body, and means controlled by the pressure supplied by one of said valvular means for controlling the flow of fluid pressure to the actuators from the other valvular means including a separate pressure responsive valve interconnected between each actuator and the first and second named valvular means.

WILFRED A. EATON.

REFERENCES CITED

The following references are of record in the file of this patent:

UNITED STATES PATENTS

| Number | Name | Date |
|---|---|---|
| 1,802,238 | Cozart | Apr. 21, 1931 |
| 1,056,844 | Simpson | Mar. 25, 1913 |
| 2,140,037 | Swisher | Dec. 13, 1938 |
| 1,516,164 | Vickers et al. | Nov. 18, 1924 |
| 2,346,820 | Casler et al. | Apr. 18, 1944 |
| 2,273,171 | Bennett | Feb. 17, 1942 |
| 2,340,237 | Upson | Jan. 25, 1944 |
| 2,074,730 | Kerr | Mar. 23, 1937 |

FOREIGN PATENTS

| Number | Country | Date |
|---|---|---|
| 130,213 | British | July 31, 1919 |
| 29,067 | British | 1909 |
| 436,317 | British | Oct. 9, 1935 |